UNITED STATES PATENT OFFICE.

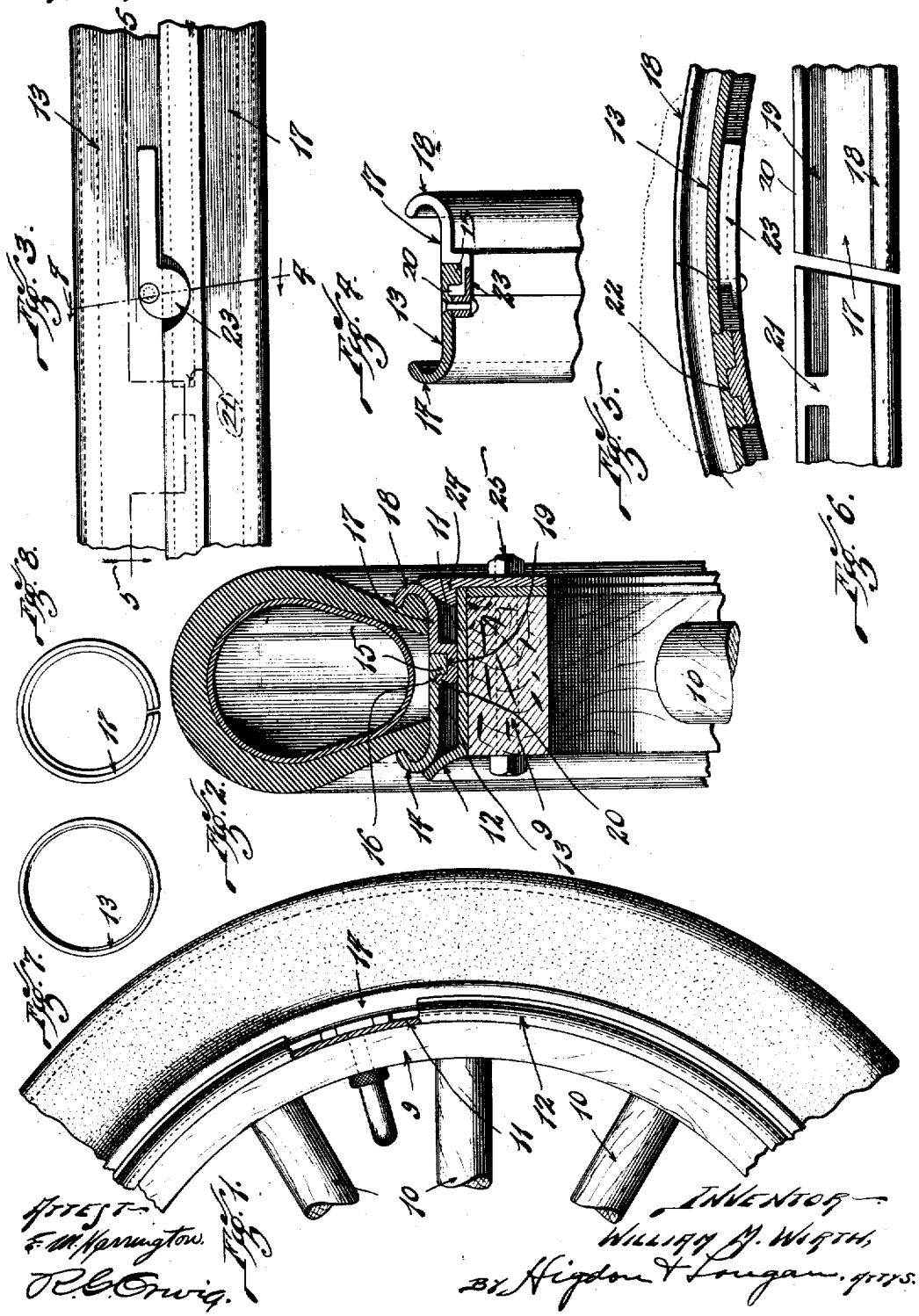

WILLIAM M. WIRTH, OF ST. LOUIS, MISSOURI, ASSIGNOR TO ST. LOUIS WELDING & MANUFACTURING COMPANY, OF ST. LOUIS, MISSOURI, A CORPORATION OF MISSOURI.

SEPARABLE DEMOUNTABLE RIM.

1,268,525.   Specification of Letters Patent.   Patented June 4, 1918.

Application filed February 12, 1914. Serial No. 818,313.

*To all whom it may concern:*

Be it known that I, WILLIAM M. WIRTH, a citizen of the United States, and resident of St. Louis, Missouri, have invented certain new and useful Improvements in Separable Demountable Rims, of which the following is a specification containing a full, clear, and exact description, reference being had to the accompanying drawings, forming a part hereof.

The invention relates particularly to clencher type rims for wheels of automobiles and other vehicles which are fitted with pneumatic tires, and the object of the invention is to provide for demounting or removing the tire and rim from the wheel as a unit and to provide for easily and quickly separating the rim so as to remove and replace the tire. The invention consists chiefly in constructing the rim in two rings, which are adapted to interengage and be locked together inseparably in assembled position of the rim on the wheel, but which can be easily separated when off the wheel. What the invention consists in is further defined in the appended claims.

In the accompanying drawings, which form part of this specification, and in which the same reference characters designate the same parts in the several views, Figure 1 is a side view of a portion of a wheel and rim embodying the invention, shown in assembled position with a tire thereon;

Fig. 2 is a cross-section of the same, drawn to a larger scale than Fig. 1;

Fig. 3 is an inside view of a portion of the rim, showing the latch and end of the split ring;

Fig. 4 is a cross-section of the same on the line 4—4 in Fig. 3, looking in the direction of the arrows;

Fig. 5 is a longitudinal section of the same on the line 5—5 in Fig. 3, looking in the direction of the arrows;

Fig. 6 is an outer face view of the ends of the split ring;

Fig. 7 is a side view of one of the parts of the rim, drawn to a small scale, showing it a complete ring; and Fig. 8 is a side view of the other part of the rim, showing it a split or open ring.

The drawings illustrate the invention applied to a wheel having a wooden felly 9 and spokes 10 of ordinary construction. A metal felly band 11 surrounds the felly and is permanently secured thereto in any suitable manner. One edge of the band 11 (preferably the one at the inner side of the wheel) is provided with an outwardly projecting flange 12 which slopes away from the band, forming an inclined or sloping wall around the felly at one edge.

The demountable rim consists of two rings which are arranged side by side with their meeting edges interlocked, but separable from each other. One of the rings is endless (that is, it has a continuous periphery) and the other is split or open (that is, it is cut through at one point of its periphery). The endless ring 13 has a continuous flange or curled edge 14 projecting outward around its free edge for holding one of the beaded edges of the tire. A rib 15 projects inward along the other edge of the ring 13 for engaging with the open ring. The rib 15 is substantially rectangular in cross-sectional shape, and the ring 13 has a shallow groove 16 in its inner face next to the rib, the rib and groove extending around the ring for its entire circumference.

The open ring 17 has an outwardly projecting flange or curled edge 18 around its free edge which coöperates with the flange 14 for securing the tire; and its other edge is provided with a channel or groove 19 for receiving the rib 15 of the endless ring 13, and a flange 20 which projects into the groove 16, to hold the two rings together. The curled edge 18 of the open ring 17 coöperates with the curled edge 14 of the endless ring 13 for securing the beaded edges of the tire when the rings are locked together. A cross wall 21 bridges the channel 19 and seats in a notch 22 in the rib 15 to lock the two rings together against circumferential creeping or relative rotation. The open ring 17 fits within the continuous ring 13 and is inseparable from it when the tire is in place and inflated.

The open ring 17 is constructed of elastic metal, preferably steel, so that when it is placed in position and engaged with the fixed rim section its ends will tend to spread apart, thereby causing sufficient frictional engagement to securely unite the two rings to form a substantial rim.

This frictional engagement is sufficient under all ordinary conditions of use for locking the rings together; however, to provide a positive lock between the rings, a locking cam 23 is provided, as shown in Figs. 3, 4 and 5. This cam has its upper face beveled or inclined, as shown in Fig. 5, and the lower faces of the open ends of the channeled portion of the open ring 17 are inclined to receive the inclined portion of the cam 23 so that when the cam is moved to a position overlying said inclined ends they will be forced against the endless ring, thereby securing the ends of the open ring 17 against movement and rattling.

The assembled ring is held in place on the felly by means of a locking device 24 which is wedge-shaped at its upper end to engage the curled edge 18 of the open ring in opposition to the flange 12 of the felly band. A number of these locking devices are provided, spaced around the circumference of the wheel, and they are secured by bolts 25.

Assuming a tire to be in position, as shown in Fig. 2, in order to detach the same the locking devices 24 are removed, which frees the assembled rim, that is, both sections 13 and 17 are securely locked together. The rim sections with the tire are then removed or demounted, and the cam 23 is turned to unlock the ends of the open ring 17, after which a tool such as a screw-driver is placed between the tongue 20 and the body 13 of the rim at the open end of the ring 17, and the tool is manipulated to free the tongue 20 from the groove 16 and the rib 15 from the channel 19. After the open ring 17 with its flange 18 has been removed from the endless ring 13, the rim sections may be detached from the tire without difficulty.

This arrangement of parts, in which the two parts of the rim are secured together by locking means integral with the parts, provides as secure a rim union as in the ordinary separable rims having a separate locking means, and the operation of attaching or detaching tires is greatly facilitated by the use of only two rim elements.

I claim:

1. A separable rim consisting of two rings, one of which is endless and the other is open, said rings having means along their outer edges for securing a tire, the inner edges of said rings being provided with mating grooves and flanges, the flange of the open ring fitting within the groove of the other ring, and locking means adapted to lap across the meeting ends of the flanged edge of the open ring and secure them in the groove in the other ring.

2. A separable rim consisting of two rings, one of which is endless and the other is open, said rings having means along their outer edges for securing a tire, the inner edge of the endless ring being provided with a flange, and the inner edge of the open ring being grooved and arranged within the flanged edge of the endless ring, said groove and flange being provided with a mating tongue and notch for preventing relative angular movement between said rings, and locking means adapted to lap across the meeting ends of the open ring and secure them in the groove in the other ring.

In testimony whereof, I have signed my name to this specification, in presence of two subscribing witnesses.

WILLIAM M. WIRTH.

Witnesses:
 E. L. WALLACE,
 JOHN C. HIGDON.